United States Patent
Hinque et al.

(10) Patent No.: US 9,333,817 B2
(45) Date of Patent: May 10, 2016

(54) PNEUMATIC TIRE COMPRISING A HYDRAULIC ENGINE

(71) Applicant: The Goodyear Tire & Rubber Company, Akron, OH (US)

(72) Inventors: Daniel Paul Luc Marie Hinque, Habay-la-Neuve (BE); Anne Therese Peronnet-Paquin, Grand-Duchy of Luxembourg (LU); Edwin Deerenberg, Ettelbruck (LU); Yannick Raymond Georges Haegel, Villeneuve d'ascq (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 395 days.

(21) Appl. No.: 14/072,894

(22) Filed: Nov. 6, 2013

(65) Prior Publication Data

US 2015/0122391 A1    May 7, 2015

(51) Int. Cl.
*B60C 23/12*    (2006.01)

(52) U.S. Cl.
CPC ......... *B60C 23/12* (2013.01); *Y10T 152/10495* (2015.01)

(58) Field of Classification Search
CPC .............................. B60C 23/10; B60C 23/12
See application file for complete search history.

(56) References Cited

U.S. PATENT DOCUMENTS

| 8,651,155 B2 * | 2/2014 | Hinque | B60C 23/0493 152/418 |
| 8,656,972 B2 * | 2/2014 | Hinque | B60C 23/12 152/418 |
| 2012/0160386 A1 | 6/2012 | Hinque et al. | |
| 2014/0130357 A1 * | 5/2014 | Hinque | B29D 30/0061 29/894.3 |

FOREIGN PATENT DOCUMENTS

EP    2730437    5/2014

* cited by examiner

*Primary Examiner* — Kip T Kotter
(74) *Attorney, Agent, or Firm* — David L. King

(57) ABSTRACT

A pneumatic tire comprises a sidewall, an annular tire cavity, and a hydraulic actuator connected to the sidewall inside the annular tire cavity, wherein the hydraulic actuator has a flexible reservoir for containing a hydraulic fluid, and an opening allowing hydraulic fluid to enter the reservoir and to exit the reservoir. Further, the hydraulic actuator comprises a lever arm connected to the sidewall and holding the flexible reservoir between the lever arm and the sidewall, wherein the lever arm comprises a fluid channel allowing hydraulic fluid to flow from the reservoir through the opening out of the lever arm.

23 Claims, 5 Drawing Sheets

PNEUMATIC TIRE COMPRISING A HYDRAULIC ENGINE

FIELD OF THE INVENTION

The invention generally relates to a pneumatic tire and more specifically to a tire or self-inflating tire having an integrated hydraulic engine or actuator.

BACKGROUND OF THE INVENTION

Normal air diffusion reduces tire pressure over time so that the natural state of tires is underinflated. Accordingly, drivers should constantly check tire pressure to avoid increased fuel consumption or wear and to avoid impeded braking and/or handling performance. Even more, a substantially underinflated tire may constitute a severe safety risk. Tire pressure monitoring systems have been proposed to warn drivers when tire pressure is significantly low. Such systems, however, remain dependent upon the driver taking remedial action when warned to reinflate a tire to a recommended pressure.

It is desirable, therefore, to provide components which allow or assist in providing an automatic inflation of a tire without requiring any action of the driver.

U.S. Patent Application 2012/0160386 A1 discloses a pump and actuator assembly for a self-inflating tire. The described tire system includes a compression actuator assembly mounted to a tire carcass for compressing air for delivery to a tire cavity. The compression actuator assembly includes a hollow cylindrical containment body formed from a resilient deformable material composition and containing a quantity of non-compressible fluid medium. The containment body is affixed to a relatively high flex-deformation region of the tire carcass and reciprocally transforms between a deformed state and a non-deformed state responsive to the deformation and recovery of the tire high flex deformation region in a rolling tire. Accordingly, the containment body in the deformed state displaces a pressurized displaced quantity of the non-compressible medium which generates a compression force for application to a volume of air delivered to the tire cavity. A pump assembly is fixed to the tire carcass and includes valves for reciprocally opening and closing the inlet opening and the outlet opening of a compressor body synchronously with cyclic transformation of the containment body.

DISCLOSURE OF THE INVENTION

In a first aspect, the present invention is directed to a pneumatic tire having a sidewall and an annular tire cavity, wherein a hydraulic actuator or engine is connected to the sidewall of the tire inside the annular tire cavity. The hydraulic actuator comprises a flexible reservoir or bag for containing a hydraulic fluid and having an opening allowing hydraulic fluid to enter the reservoir and to exit the reservoir. The reservoir may deform or reciprocate reversible between a decompressed state and a compressed state. Further, a lever arm is connected to the sidewall and holds the flexible reservoir between the lever arm and the sidewall. The lever arm comprises a fluid channel allowing hydraulic fluid to flow from the reservoir through the opening out of the lever arm.

Thus, the pneumatic tire comprises a hydraulic actuator which may cyclically or periodically provide hydraulic fluid pressure upon deformation of the tire's sidewall when the tire is rolling. The invention provides a compact design which may allow connection of a hydraulic fluid tube or line to the channel extending through the lever arm.

According to an aspect, the reservoir and the lever arm extend essentially in parallel to the sidewall. Thus, the lever arm and the reservoir extend both in parallel to the sidewall and provide a compact hydraulic actuator.

According to another aspect, the lever arm extends essentially in parallel to the sidewall and the fluid channel extends essentially perpendicularly to the sidewall through the lever arm. This arrangement may improve or simplify the connection of a tube to the channel for providing hydraulic fluid from the reservoir to other places in the tire cavity, as for instance to a hydraulically actuated compressor.

Pursuant to another aspect, the flexible reservoir has a first flexible wall contacting the sidewall, and a second flexible wall facing away from the sidewall and contacting the lever arm, wherein the opening is arranged in the second wall.

According to yet another aspect, the lever arm extends essentially in parallel to the sidewall, and the fluid channel extends essentially perpendicularly to the sidewall through the lever arm. Further, the flexible reservoir has a first flexible wall contacting the sidewall, and a second flexible wall facing away from the sidewall and contacting the lever arm. The opening is arranged in the second wall to allow fluid flow from the reservoir through the opening into the fluid channel.

According to a further aspect, the lever arm has a holding portion in contact with the second wall and optionally pressing the reservoir essentially perpendicularly against the sidewall.

According to yet a further aspect, the channel passes through the lever arm in the holding portion.

In a further aspect, the reservoir comprises a nozzle or tubular member attached to the opening and extending through the channel to allow fluid flow from the opening through the tubular member and the channel. The nozzle or tubular member may extend through the whole thickness of the channel.

According to another aspect, either the channel or the nozzle may comprise an inner thread for allowing a screwed connection to a tube or line. Such a tube may conduct hydraulic fluid from the reservoir to other locations in the tire. The tube may comprise a connector comprising a thread corresponding to a thread in the channel or nozzle for connecting the tube to the channel or nozzle.

In general, the hydraulic fluid may be an incompressible fluid such as oil or water.

According to a further aspect, the channel is fixed to the opening and allows fluid to flow out of the opening and through the channel, and vice versa. The reservoir may for instance be glued to the lever arm. Alternatively, the lever arm and the hydraulic reservoir may be a single-piece member.

According to another aspect, the lever arm comprises a mounting portion for mounting the lever arm to the sidewall. The mounting portion may comprise at least one aperture having a seat for receiving a screw for mounting the hydraulic actuator to the sidewall. Alternatively or in addition, the mounting portion may be glued to the sidewall. The mounting portion may have a convex shape adapted to the curvature of the sidewall. Alternatively or in addition, the sidewall may comprise a mounting member, for receiving the mounting portion of the lever arm. The mounting member could be an integral part of the sidewall and may be made of rubber material. Further, a mounting member may comprise reinforcing elements as fibers or wires.

According to yet another aspect, the flexible reservoir further comprises a first flexible wall contacting the sidewall, and a second flexible wall facing away from the sidewall and contacting the lever arm, wherein the opening is arranged in the second wall and faces the lever arm. Further, the lever arm comprises a holding portion in contact with the second wall and optionally pressing the reservoir essentially perpendicularly against the sidewall. Moreover, the lever arm may comprise an aforementioned mounting portion. The holding portion and the mounting portion are arranged at two opposing ends of the lever arm. The thickness of a connecting portion connecting the holding portion and the mounting portion of the lever arm may be smaller than the thickness of the mounting portion and/or of the holding portion. The thickness may be considered essentially in parallel to the axial direction of the tire.

Pursuant to another aspect, the hydraulic actuator comprises a sheet-like or plate-like support extending in parallel to the sidewall and connecting the flexible reservoir to the sidewall. The shape of the support may be adapted to the curvature of the sidewall at the mounting location. The support may connect the first wall of the reservoir to the sidewall of the tire.

According to another aspect, at least two of the lever arm, the flexible reservoir and the support, and optionally also the nozzle, are formed as a single-piece or integral member. However, this does not mean that they must be made of the same material. For example, at least two of them may be 3D-printed, wherein 3D-printing allows printing of different polymers having different properties as e.g. different hardness or stiffness. Alternatively, at least one of the lever arm, the reservoir, the nozzle, and the support may be molded. For example, at least one of them may be made of rubber or thermoplastic or a combination of those materials and may be reinforced with fibers (metallic or fabric). At least two of the lever arm, the reservoir and the support may be made of different rubber composition having different hardness or stiffness. At least two of them may be molded as a single-piece member, although they may comprise different materials.

According to yet another aspect, the lever arm is made of a first material and the flexible reservoir is made of a second material, wherein the first material of the lever arm has a higher stiffness than the second material of the flexible reservoir.

In a further aspect, the lever arm has at least twice the thickness of the first wall and/or the second wall of the reservoir.

In another aspect, the lever arm and the flexible reservoir have each an elongated shape extending essentially in a radial direction of the tire.

In general, the actuator may be glued or screwed to the sidewall. For example, the lever arm may be screwed or glued to the sidewall. Alternatively or in addition, the support may be glued to the first wall and connected to the sidewall by a screwed connection and/or a glued connection.

According to another aspect, the first wall and the second wall have each a convex curvature, and wherein the convex curvatures are directed away from each other to enclose a volume between the first wall and the second wall. The first wall and the second wall may be connected with each other at two ends with respect to an elongate shape of the reservoir and/or with respect to the radial direction. The convex curvature of the first wall may correspond essentially to the curvature of the sidewall facing that curvature.

The present invention may also be directed to a tire or tire assembly comprising a tire with a hydraulic actuator according to one or more of the above described aspects as well as a hydraulically driven air compressor in hydraulic communication with the hydraulic actuator. The compressor may be connected to the hydraulic actuator via a tube conducting hydraulic fluid between the compressor and the actuator. Alternatively, the compressor may be connected directly to the nozzle and/or may be mounted on the lever arm. The tube may be connected to the channel or a nozzle in the lever arm via a mechanical connection, e.g. a screwed connection. Alternatively or in addition, the tube could be glued to the channel or nozzle.

According to a further aspect, the compressor may be mounted to the tire's sidewall and/or may be fluidly connected to an air passageway extending through the tire's sidewall for receiving air to be pumped into the tire. The compressor may further comprise an air outlet for releasing or pumping air into the tire cavity upon cyclical actuation by hydraulic fluid pressure caused by the tire's sidewall deformation when the tire is rolling over the ground.

All features of the above described aspects of the invention may be combined with or replaced by one another.

BRIEF DESCRIPTION OF THE DRAWINGS

In the following, the Figures according to the embodiments of the present invention are briefly described. Further details are given in the detailed description of the embodiments. The Figures have the purpose of illustrating the invention and should not be understood in a limiting sense.

DEFINITIONS

"Axial" and "axially" means lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt structure" or "reinforcing belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial Plane" means the plane perpendicular to the tire's axis of rotation and passing through the center of the tread.

"Groove" means an elongated void area in a tire wall that may extend circumferentially or laterally about the tire wall. The "groove width" may be equal to its average width over its length.

"Peristaltic" means operating by means of wave-like contractions that propel contained matter, such as air, along tubular pathways.

"Radial" and "radially" means directions radially toward or away from the axis of rotation of the tire.

"Sidewall" means that portion of a tire between the tread and the bead.

"Tread" means a rubber component which when bonded to a tire carcass includes that portion of the tire that comes into contact with the road when the tire is normally inflated and under normal load.

DETAILED DESCRIPTION OF THE EMBODIMENTS

Figure 1:
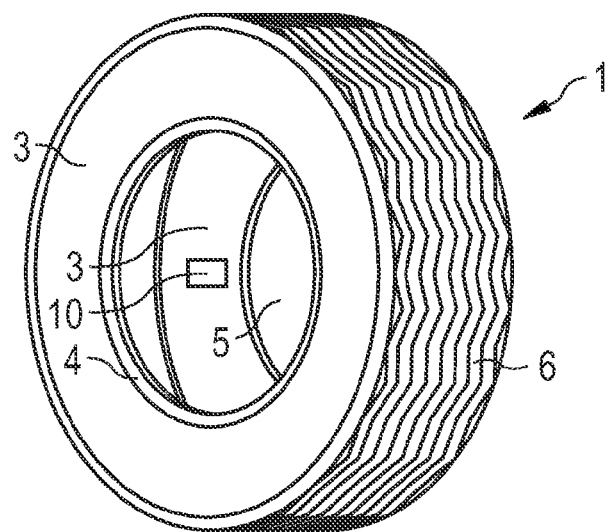
FIG. 1 is a perspective view of a tire comprising a hydraulic actuator according to an embodiment of the invention.

FIG. 1 is a perspective representation of a tire 1 according to an embodiment of the invention. The tire 1 comprises sidewalls 3 extending between a tread or tread region 6 and beads 4. Further, the tire's sidewalls 3 define an annular tire cavity 5. According to the preferred embodiment, a hydraulic actuator or engine 10 is attached to a sidewall 3 of the tire 1. The hydraulic actuator may be driven by the cyclical or periodical deformation of the tire 1 when tire 1 is rolling.

Figure 2:
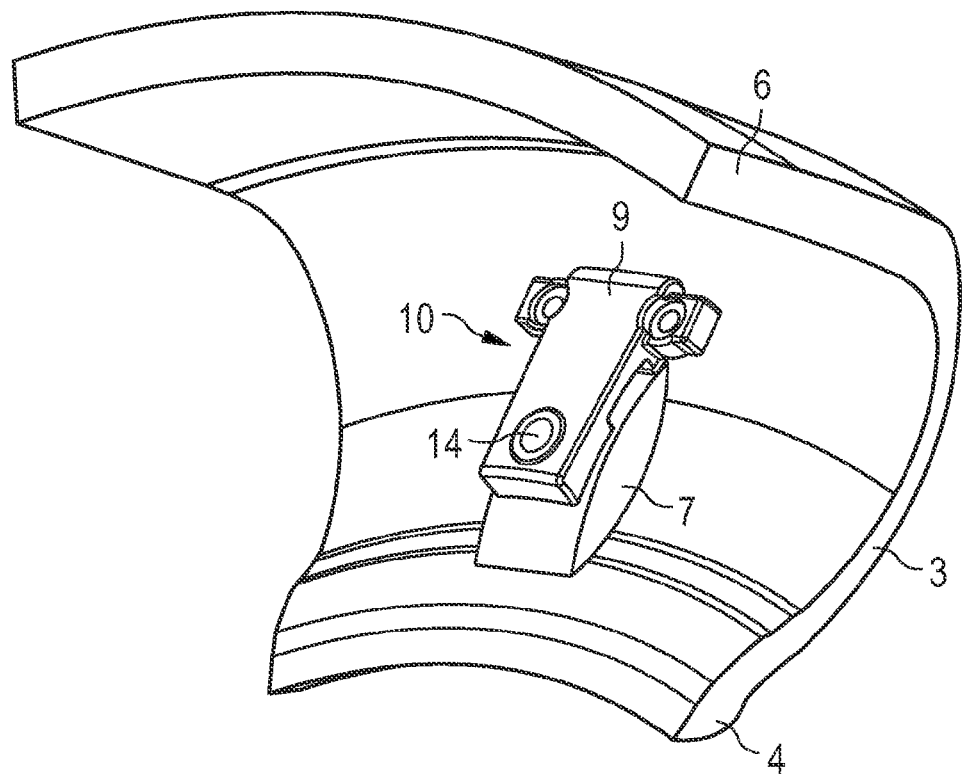
FIG. 2 is a perspective partial cross sectional view of the tire comprising a hydraulic actuator according to FIG. 1.

FIG. 2 shows a detailed partial cross section of the tire 1 according to FIG. 1. Referring to FIG. 2, the hydraulic actuator 10 comprises a flexible or reversibly deformable reservoir 7 which is attached via a lever arm 9 to the sidewall 3 inside the tire cavity 5. The lever arm 9 comprises a through hole or channel 14 which allows hydraulic fluid contained in the reservoir or bag 7 to exit the latter through the lever arm 9. The lever arm 9 may hold the reservoir 7 between the lever arm 9 and the sidewall 3. In particular, the lever arm 9 and the reservoir 7 may each have an elongated shape and may extend in a radial direction, wherein the lever arm 9 and/or the reservoir 7 may be connected to the sidewall via screwed or glued connection. The connection may be established via further supporting members (indirect connection) or directly via connecting means as screws or glue (direct connection).

Figure 3:
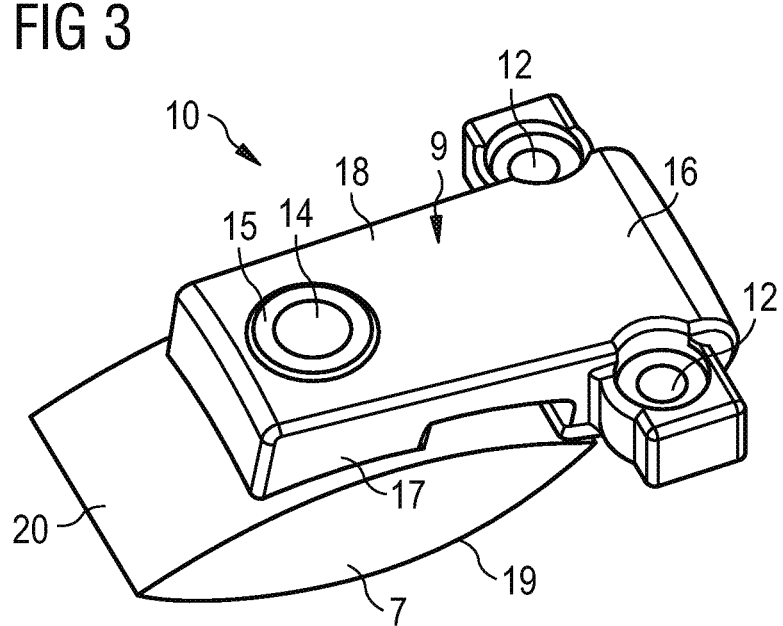
FIG. 3 is a perspective view of the hydraulic actuator depicted in FIG. 1.

FIG. 3 is a magnified perspective view of the hydraulic actuator shown in FIG. 2. The reservoir 7 comprises a first wall 19 facing the side wall 3 and a second wall 20 facing the lever arm 9. Both walls may have a convex curvature and may be connected with each other to enclose a hollow space for containing a fluid. Further, the fluid reservoir 7 may comprise a nozzle 15 extending through the channel 14 of the lever arm 9.

The lever arm 9 may have three portions, i.e. a mounting portion 16, a holding portion 17 and a connecting or bridging portion 18. The mounting portion 16 may be used to attach or mount the hydraulic actuator to the tire's sidewall 3. As shown in the example embodiment, the holding portion may comprise two through holes 12 which allow connecting the lever arm 9 to the tire 1 via screws (not shown). The holding portion 17 may be in contact and or attached to the reservoir 7 and may comprise the channel 14. The holding portion 17 and the mounting portion 16 are arranged at opposing end regions of the lever arm 9. Both portions may be connected via the connecting portion 18.

Figure 4:
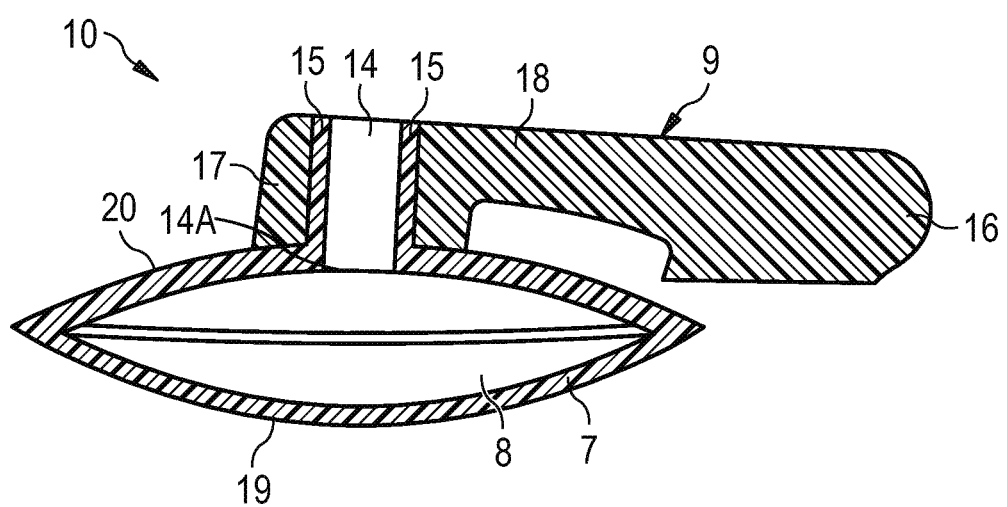
FIG. 4 is a cross sectional view of the hydraulic actuator shown in FIGS. 2 and 3.

Referring to FIG. 4, the nozzle or tubular member 15 may be an integral part of the flexible reservoir 7 comprising the hydraulic fluid 8. When placed inside the channel 14, the nozzle 15 may extend over the whole length of the channel 14. In particular, the nozzle may comprise an inner thread (not shown) which may allow the connection of tubes or lines comprising complementary threads for conducting hydraulic fluid 8 out of the reservoir 7 or into the reservoir 7 through opening 14A.

Figure 5:
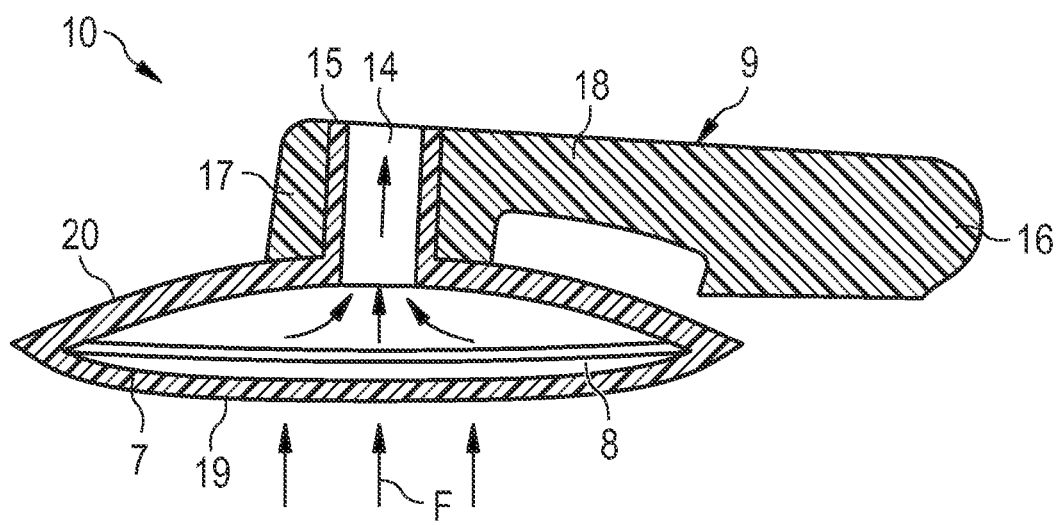
FIG. 5 is a cross sectional view of the hydraulic actuator shown in FIGS. 2 to 4 in a compressed state.

While the hydraulic actuator 10 is shown in FIGS. 2 to 4 in a decompressed state, FIG. 5 shows the actuator 10 in a compressed state. In particular, the lower wall 19 has been deformed by a force F exerted by the cyclic deformation of the tire's sidewall, when the tire 1 is rolling. Although not explicitly depicted, the upper wall 20 may also deform. The deformation or compression of the reservoir 7 results in an elevated or higher hydraulic fluid pressure in the reservoir 7 and forces hydraulic fluid 8 out of the reservoir 7 and through the nozzle 15 extending through the channel 14 in the lever arm 9. After the sidewall 3 returns to its non-deformed or initial state, the flexible reservoir 7 returns to its original shape as depicted in the preceding Figures. Thus, the reservoir 7 may reciprocate between a compressed and a decompressed state upon cyclical or periodical deformation of the tire's sidewall 3.

Figure 6:
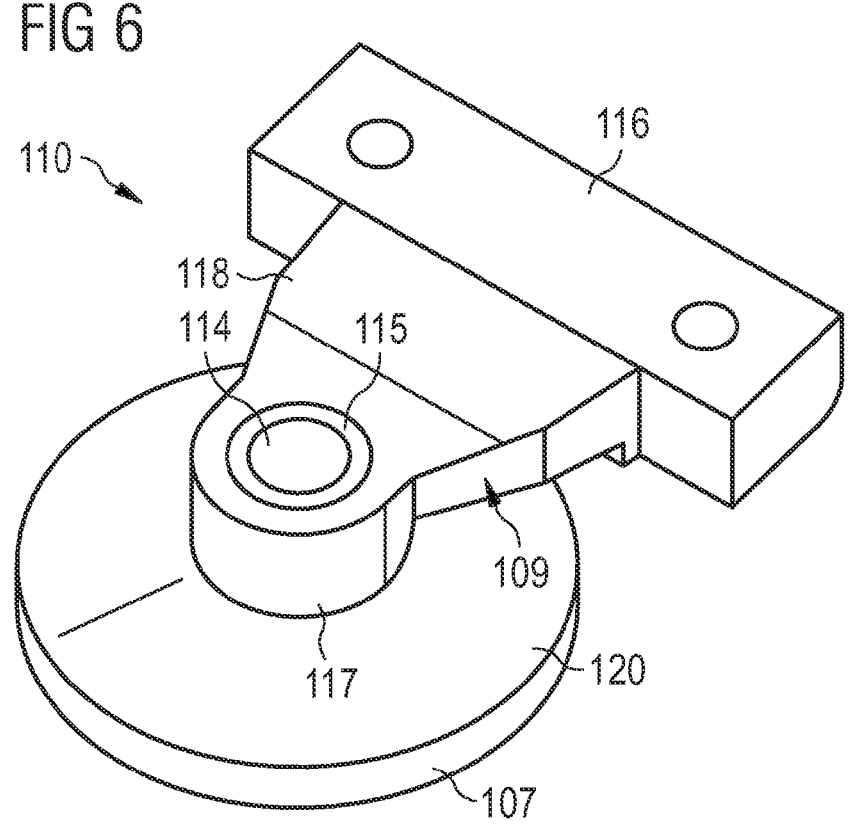
FIG. 6 is a perspective view of a hydraulic actuator according to another embodiment of the invention.

FIG. 6 represents another embodiment of a hydraulic actuator 110 which comprises the same basic elements as the embodiment described with respect to the preceding Figures. Thus, the actuator comprises a flexible reservoir 107, a lever arm 109 comprising a mounting portion 116, a connecting portion 118 and a holding portion 117 comprising a channel 114. A nozzle 115 of the reservoir 107 may extend essentially perpendicularly from an upper wall 120. However, the reservoir 107 has a rotational symmetry with respect to an axis extending along a centerline of the nozzle 115.

In general, it is also possible that the nozzle is not an integral part of the reservoir 107 but a separate element.

Figure 7:
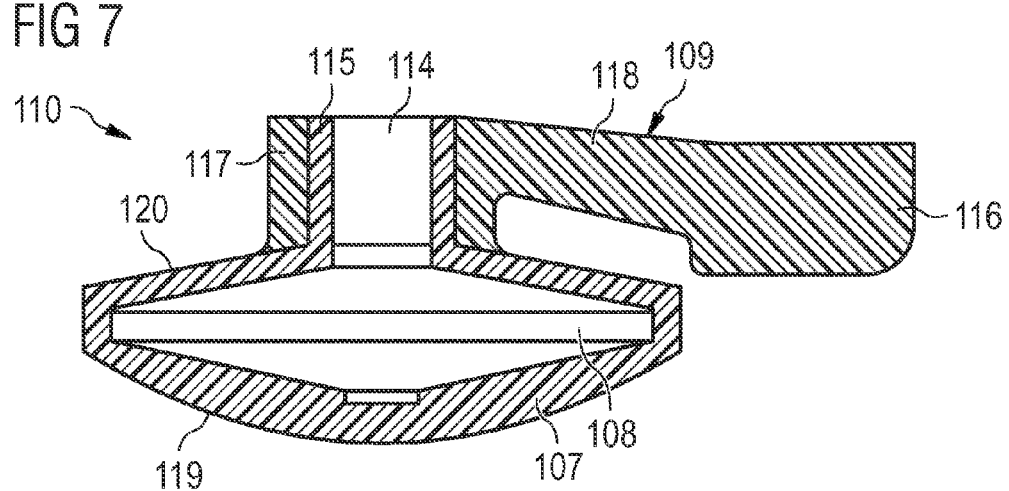
FIG. 7 is a cross sectional view of the hydraulic actuator shown in FIG. 6.

FIG. 7 is a cross sectional view of the hydraulic actuator 110 according to FIG. 6. A deformation (not shown) of the lower wall 119 and/or the upper wall 120 upon a deformation of the tire's sidewall 3 may force hydraulic fluid 108 to exit the reservoir 107 via the nozzle 115.

Figure 8:
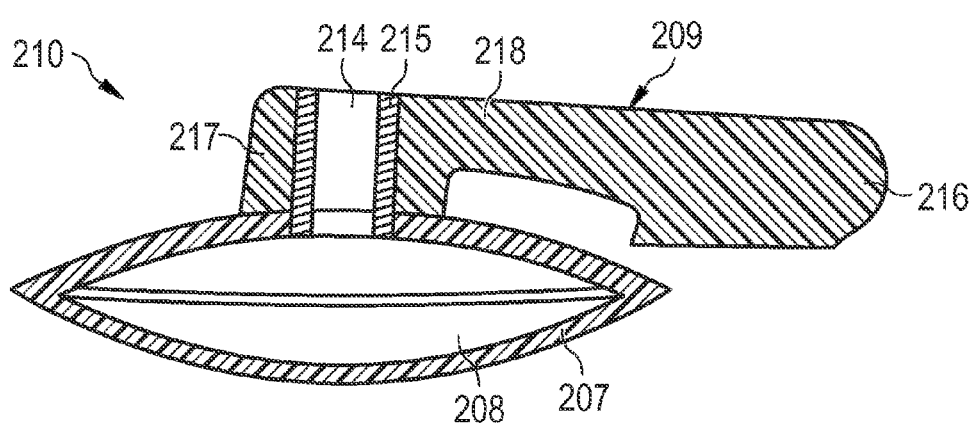
FIG. 8 is a cross sectional view of a hydraulic actuator according to another embodiment of the present invention.

FIG. 8 represents a cross sectional view of a hydraulic actuator 210 according to a further embodiment of the invention. The design is similar to that of the actuator shown in FIGS. 2 to 5 but the lever arm 209 is directly connected to the reservoir 207. Such a connection may for instance be provided by gluing. Alternatively, the lever arm 209 and the reservoir 207 may be formed as an integral or single-piece member. Thus, hydraulic fluid 208 may directly pass from the reservoir 207 through the opening 214 in the lever arm 209. As mentioned before, the lever arm may have a holding portion 217 and a mounting portion 216 connected via a connecting portion 218. Still with reference to FIG. 8, the hydraulic actuator 210 comprises a nozzle 215 which is provided as a separate member extending through the lever arm 209.

Figure 9:
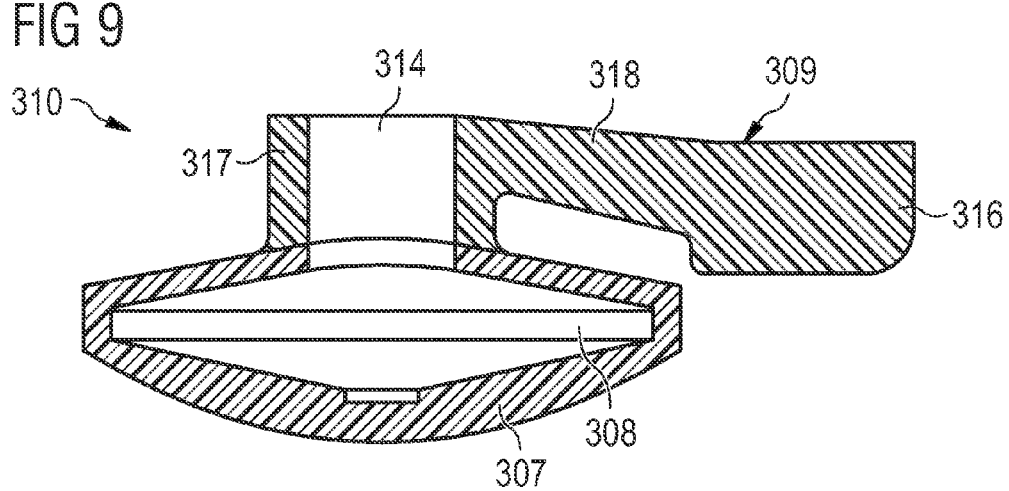
FIG. 9 is a cross sectional view of a hydraulic actuator according to yet another embodiment of the invention.

In the further embodiment of FIG. 9, a hydraulic actuator 310 is similar to the hydraulic actuator 110 as shown in FIGS. 6 and 7 but does not comprise a nozzle extending through a channel 314 in the lever arm 309. The reservoir 307 comprising hydraulic fluid 308 is connected to the channel 314. As mentioned before, the lever arm 309 may have a holding portion 317 and a mounting portion 316 connected via a connecting portion 318.

Figure 10:
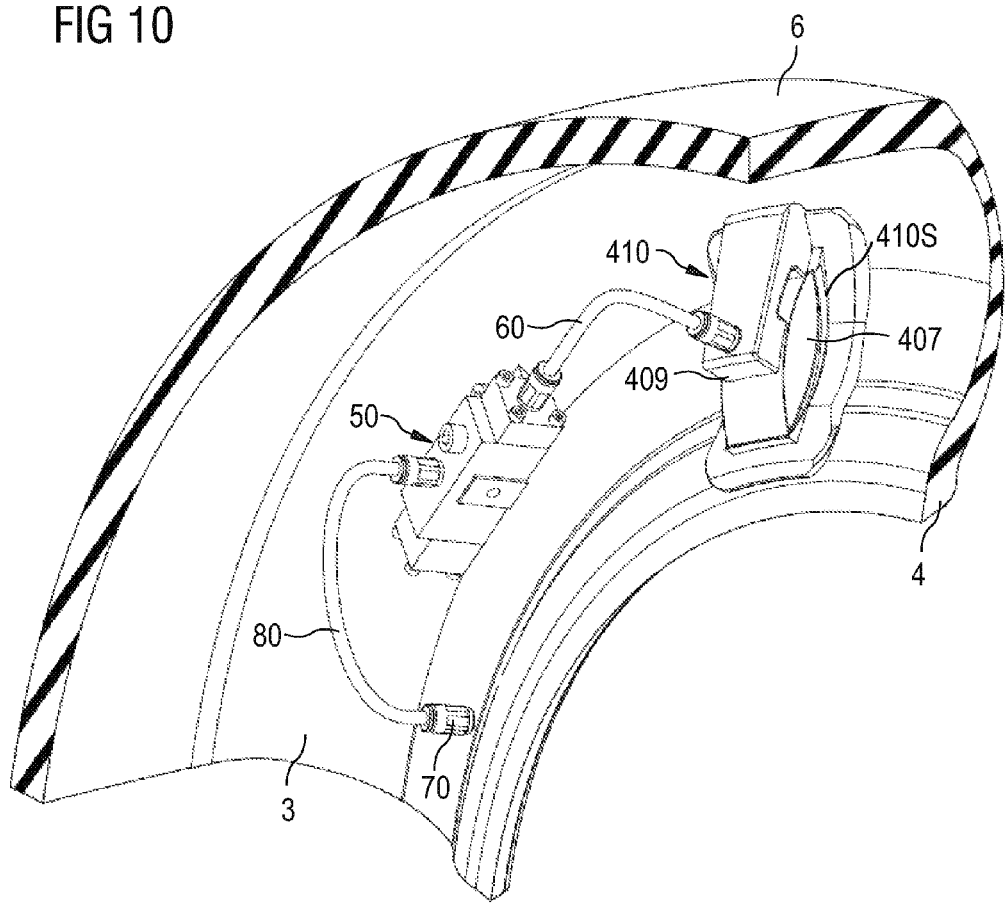
FIG. 10 is a perspective partial cross sectional view of a tire comprising a hydraulic actuator connected to a hydraulically driven air compressor according to another embodiment of the present invention.

Referring now to FIG. 10, another example of an actuator 410 is mounted to a tire's sidewall 3 extending between a tread 6 and a bead 4. The lever arm 409 comprises a channel connecting the flexible reservoir 407 with a tube 60 which provides hydraulic fluid to a hydraulically driven compressor 50. In the depicted embodiment, the compressor 50 is also mounted to the sidewall 3 and may pump air into the tire cavity. For that purpose, the compressor 50 may be connected via a tube 80 with an air inlet 70 connected to an air passageway (not visible in FIG. 10) through the tire's sidewall 3. By means of the air compressor 50, air received via tube 80 is pumped through an air outlet (not depicted in FIG. 10) into the tire cavity by cyclical provision of hydraulic fluid pressure caused by the cyclical deformation of the reservoir 407 upon rotation of the tire over the ground. FIG. 10 shall provide merely an example of a possible application of a hydraulic actuator according to the present invention. In particular, the specific layout of the compressor 50 shall not be understood as a main element of the present application. Further, the actuator 410 is depicted in FIG. 10 with several supporting members disposed between the reservoir 407 and the tire's sidewall 3 such as a sheet like support 410S. Such supporting members are however to be considered as fully optional and shall not be understood as essential for the depicted embodiment. Nevertheless, such further supporting members, which may extend over a larger surface area of the sidewall 3 as the reservoir 407 as such, may improve the connection between the actuator 410 and the sidewall 3, as for instance by means of a larger interface in order to further improve a glued connection. In addition, a lever arm 409 may be screwed or glued to such supporting members. Alternatively, all depicted members of the actuator 410 may form an integral part of the actuator 410 or, in other words, the actuator 410 may be a single-piece member formed e.g. by 3D-printing or molding.

In general, one or more elements of the hydraulic actuators 10, 110, 210, 310, 410 may be molded or 3D-printed. Further, one or more elements may be made of rubber or polymers or a combination of those materials and may optionally be reinforced with fibers (metallic or fabric). In general, a lever arm 9, 109, 209, 309, 409 may have a greater thickness than a wall of the reservoir 7. Further, any lever arm may be made of plastics or metal. In case of molding or 3D-printing one or more of the actuator's elements may form a single-piece member. Then, each element may comprise the same material or the elements may comprise materials different from one another although the actuator is formed in a single step, i.e. without assembling the different elements one after another after their production.

In general, a mounting portion 16, 116, 216, 316 or a lever arm 9, 109, 209, 309, 409 may be mounted to the sidewall 3 of a tire 1 via connecting means. Such means may comprise a spacer plate or support plate and/or screws or glue. However, the exact manner of attachment is not a main aspect of the present application.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case the above described embodiments shall not be understood in a limiting sense. In particular, the features of the above embodiments may also be replaced by one another or combined with one another.

The invention claimed is:

1. A pneumatic tire having a sidewall and an annular tire cavity, the tire comprising:
a hydraulic actuator connected to the sidewall of the tire inside the annular tire cavity, the hydraulic actuator comprising:
a flexible reservoir for containing a hydraulic fluid and having an opening allowing hydraulic fluid to enter the reservoir and to exit the reservoir; and
a lever arm connected to the sidewall and holding the flexible reservoir between the lever arm and the sidewall,
wherein the lever arm comprises a fluid channel allowing hydraulic fluid to flow from the reservoir through the opening out of the lever arm.

2. The tire according to claim 1, wherein the reservoir and the lever arm extend essentially in parallel to the sidewall.

3. The tire according to claim 1, wherein the lever arm extends essentially in parallel to the sidewall and wherein the fluid channel extends essentially perpendicularly to the sidewall through the lever arm.

4. The tire according to claim 1, wherein the flexible reservoir has a first flexible wall contacting the sidewall, and a second flexible wall facing away from the sidewall and contacting the lever arm, wherein the opening is arranged in the second wall.

5. The tire according to claim 4, wherein the lever arm has a holding portion in contact with the second wall and pressing the reservoir essentially perpendicularly against the sidewall.

6. The tire according to claim 5, wherein the channel passes through the lever arm in the holding portion.

7. The tire according to claim 4, wherein hydraulic actuator further comprises a sheet-like support interposed between and connecting the first wall to the sidewall.

8. The tire according to claim 7, wherein the support is glued to the first wall and connected to the sidewall by a glued connection.

9. The tire according to claim 4, wherein the lever arm has at least twice the thickness than the first wall and the second wall of the reservoir.

10. The tire according to claim 4, wherein the first wall and the second wall have each a convex curvature, and wherein the convex curvatures are directed away from each other to enclose a volume between the first wall and the second wall.

11. The tire according to claim 10, wherein the convex curvature of the first wall corresponds essentially to the curvature of the sidewall facing that curvature.

12. The tire according to claim 1, wherein the lever arm extends essentially in parallel to the sidewall, and wherein the fluid channel extends essentially perpendicularly to the sidewall through the lever arm, and wherein the flexible reservoir has a first flexible wall contacting the sidewall, and a second flexible wall facing away from the sidewall and contacting the lever arm, and wherein the opening is arranged in the second wall to allow fluid flow from the reservoir through the opening into the fluid channel.

13. The tire according to claim 1, wherein the reservoir comprises a nozzle attached to the opening and extending through the channel to allow fluid flow from the opening through a tubular member and the channel.

14. The tire according to claim 1, wherein the channel is fixed to the opening and allows fluid to pass out of the opening and through the channel.

15. The tire according to claim 1, wherein the lever arm comprises a mounting portion for mounting the lever arm to the sidewall.

16. The tire according to claim 1,
wherein the flexible reservoir further comprises a first flexible wall contacting the sidewall, and a second flexible wall facing away from the sidewall and contacting the lever arm, wherein the opening is arranged in the second wall; and wherein the lever arm further comprises a holding portion in contact with the second wall and pressing the reservoir essentially perpendicularly against the sidewall, and a mounting portion for mounting the lever arm to the sidewall, wherein the holding portion and the mounting portion are arranged at two opposing ends of the lever arm.

17. The tire according to claim 16, wherein the mounting portion comprises at least one aperture having a seat for receiving a screw for mounting the hydraulic actuator to the sidewall.

18. The tire according to claim 17, wherein the hydraulic actuator is 3D-printed or molded.

19. The tire according to claim 1, wherein hydraulic actuator further comprises a sheet-like support extending in parallel to the sidewall and connecting the flexible reservoir to the sidewall.

20. The tire according to claim 1, wherein the lever arm is made of a first material and the flexible reservoir is made of a second material, wherein the first material of the lever arm has a higher stiffness than the second material of the flexible reservoir.

21. The tire according to claim 1, wherein the lever arm and the flexible reservoir have each an elongated shape extending essentially in a radial direction of the tire.

22. The tire according to claim 1, wherein the actuator is glued or screwed to the sidewall.

23. The tire according to claim 22, wherein the lever arm is screwed or glued to the sidewall.

* * * * *